United States Patent
Hashizume et al.

(10) Patent No.: US 10,442,870 B2
(45) Date of Patent: Oct. 15, 2019

(54) CELLULOSE ACYLATE-OXOALKANOATE

(71) Applicant: DAICEL CORPORATION, Osaka-shi, Osaka (JP)

(72) Inventors: Tomohiro Hashizume, Himeji (JP); Shizuka Ukita, Himeji (JP); Shu Shimamoto, Tokyo (JP); Toshikazu Nakamura, Himeji (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 15/126,893

(22) PCT Filed: Mar. 19, 2014

(86) PCT No.: PCT/JP2014/057569
§ 371 (c)(1),
(2) Date: Sep. 16, 2016

(87) PCT Pub. No.: WO2015/140965
PCT Pub. Date: Sep. 24, 2015

(65) Prior Publication Data
US 2017/0088636 A1    Mar. 30, 2017

(51) Int. Cl.
C08B 3/12      (2006.01)
C08B 31/04     (2006.01)
C08B 37/00     (2006.01)
C08B 3/16      (2006.01)

(52) U.S. Cl.
CPC .................... C08B 3/16 (2013.01)

(58) Field of Classification Search
CPC ............ C08B 3/12; C08B 31/04; C08B 37/00
USPC ........................................ 536/58, 63, 68, 69
See application file for complete search history.

(56) References Cited

U.S. PATENT DOCUMENTS

| | | | |
|---|---|---|---|
| 4,981,959 A * | 1/1991 | Diamantoglou | B01D 71/08 536/100 |
| 5,292,877 A | 3/1994 | Edgar et al. | |
| 5,360,843 A | 11/1994 | Edgar et al. | |
| 5,420,267 A | 5/1995 | Edgar et al. | |
| 5,521,304 A | 5/1996 | Edgar et al. | |
| 5,595,591 A | 1/1997 | Edgar et al. | |
| 2002/0106747 A1 | 8/2002 | Cheng et al. | |
| 2009/0326216 A1 | 12/2009 | Stegmann et al. | |

FOREIGN PATENT DOCUMENTS

| | | |
|---|---|---|
| EP | 0 598 038 A1 | 5/1994 |
| EP | 1 278 780 A2 | 1/2003 |
| EP | 2 035 458 A1 | 3/2009 |
| JP | 6-510805 A | 12/1994 |
| JP | 2003-82001 A | 3/2003 |
| JP | 2003-632410 A | 11/2003 |
| JP | 2006-8866 A | 1/2006 |
| JP | 2009-540075 A | 11/2009 |
| WO | WO 93/03063 A1 | 2/1993 |
| WO | WO 01/85800 A2 | 11/2001 |
| WO | WO 2007/144282 A1 | 12/2007 |
| WO | WO 2013/085397 A1 | 6/2013 |

OTHER PUBLICATIONS

Edgar et al., "Synthesis and Properties of Cellulose Acetoacetates", Macromolecules, vol. 28, 1995, pp. 4122-4128.
International Search Report issued in PCT/JP2014/057569, dated Jul. 1, 2014.
Yoshida et al., "Structural analysis of polymer-brush-type cellulose β-ketoesters by molecular dynamics simulation", Cellulose, vol. 15, 2008, pp. 651-658.
Chinese Office Action and Search Report for Chinese Application No. 201480077202.4, dated Aug. 1, 2018, with English translation.

* cited by examiner

*Primary Examiner* — Shaojia A Jiang
*Assistant Examiner* — Everett White
(74) *Attorney, Agent, or Firm* — Birch, Stewart, Kolasch & Birch, LLP

(57) ABSTRACT

Provided is a novel cellulose derivative having excellent water resistance. This is a cellulose acylate oxoalkanoate which is a cellulose derivative corresponding to cellulose, except with substituents replacing part or all of hydrogen atoms in the hydroxy groups of the cellulose. The substituents includes a group represented by General Formula (1) and a group represented by General Formula (2). The cellulose acylate oxoalkanoate has a degree x of substitution with the group represented by General Formula (1), a degree y of substitution with the group represented by General Formula (2), and a degree z of unsubstitution, where x, y, and z meet conditions specified by Expressions (A), (B), and (C):

$$0.1 \leq x \leq 2.99 \quad (A)$$

$$0.01 \leq y \leq 2.90 \quad (B)$$

$$z = 3-x-y \quad (C)$$

[Chem. 1]

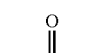

(1)

[Chem. 2]

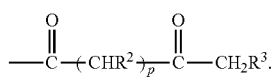

(2)

8 Claims, 1 Drawing Sheet

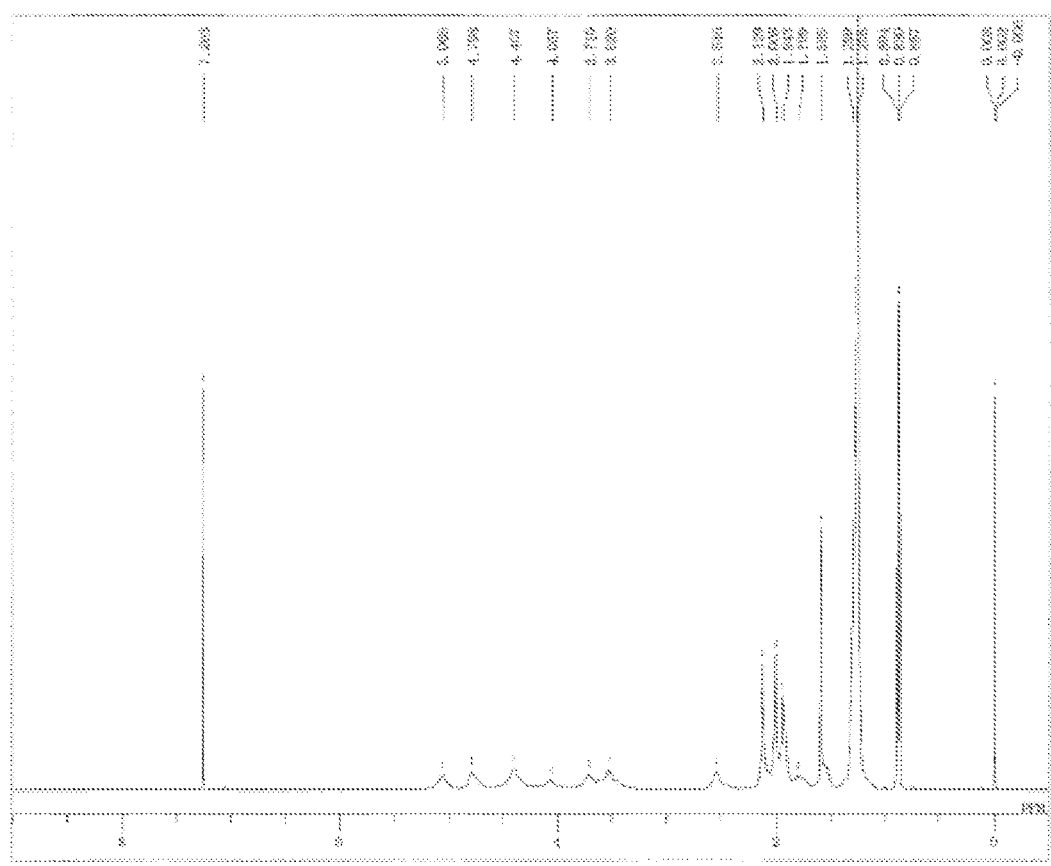

CELLULOSE ACYLATE-OXOALKANOATE

TECHNICAL FIELD

The present indention relates to a novel cellulose derivative.

BACKGROUND ART

Cellulose is a polymeric compound which is a polymer of a multiplicity of glucose rings (glucopyranose units) linked and polymerized through β-1,4-glycoside bonds. Cellulose and derivatives thereof are now widely used in uses such as paper and various formed products (molded products).

Cellulose is a material having high hydrophilicity. However, cellulose is often derivatized and thereby hydrophobized before use, because the hydrophilicity may act disadvantageously in uses requiring water resistance (water proofness). Examples of such cellulose derivatives include cellulose acetate, cellulose acetate propionate, and cellulose acetate butyrate, each of which is obtained by reacting cellulose with an acylating agent such as acetic anhydride, propionic anhydride, or butyric anhydride. Such cellulose derivatives are commercially available in industrially available forms. In addition to the cellulose esters, other cellulose derivatives such as methylcellulose, ethylcellulose, hydroxyethylcellulose, hydroxypropylcellulose, and carboxymethylcellulose are commercially available in industrially available forms.

In addition to the above-mentioned cellulose derivatization techniques, for example, Non Patent Literature (NPL) 1 reports a technique of reacting cellulose with an alkylketene dimer to synthetically prepare a cellulose (3-oxoalkanoate). NPL 2 reports a technique of reacting cellulose with acetic anhydride and diketone to synthetically prepare a cellulose acetate (3-oxoalkanoate).

CITATION LIST

Non Patent Literature

NPL 1: Cellulose (2008), 15, 652
NPL 2: Macromolecules (1995), 28, 4122

SUMMARY OF INVENTION

Technical Problem

However, none of the known cellulose derivatives is considered to have sufficient water resistance, and under such present circumstances, demands are made to provide cellulosic materials that are usable in uses requiring higher water resistance.

Accordingly, the present invention has an object to provide a novel cellulose derivative having excellent water resistance.

Solution to Problem

After intensive investigations to achieve the object, the inventors of the present invention here found a cellulose derivative containing both an acyl group and an oxoalkanoyl group as substituents; and have found that this cellulose derivative has excellent water resistance. The present invention has been made based on these findings.

Specifically, the present invention provides followings.

(1) The present invention provides a cellulose acylate oxoalkanoate which is a derivative of cellulose, except with substituents replacing part or all of hydrogen atoms in hydroxy groups of the cellulose. The substituents include a group represented by General Formula (1) and a group represented by General Formula (2). The cellulose acylate oxoalkanoate has a degree x of substitution with the group represented by General Formula (1), a degree y of substitution with the group represented by General Formula (2), and a degree z of unsubstitution, where x, y, and z meet conditions specified by Expressions (A), (B), and (C), $$0.1 \leq x \leq 2.99 \quad (A)$$

$$0.01 \leq y \leq 2.90 \quad (B)$$

$$z = 3 - x - y \quad (C),$$

[Chem. 1]

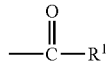

(1)

where $R^1$ is selected from $C_1$-$C_{10}$ alkyl, a straight or branched chain unsaturated hydrocarbon group, and an optionally substituted aromatic group,

[Chem. 2]

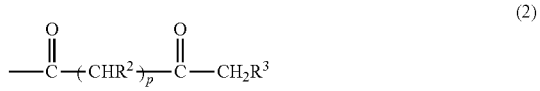

(2)

where $R^2$ and $R^3$ are, identically or differently in each occurrence, selected from hydrogen, $C_1$ or higher alkyl, a straight or branched chain unsaturated hydrocarbon group, and an optionally substituted aromatic group; and p represents an integer of 1 to 10, and where at least one of $R^2$ and $R^3$ is not hydrogen when p is 1.

(2) In the cellulose acylate oxoalkanoate according to (1), the group represented by General Formula (2) may be a group represented by General Formula (2'):

[Chem. 3]

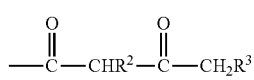

(2')

where $R^2$ and $R^3$ are as in General Formula (2), and where at least one of $R^2$ and $R^3$ is not hydrogen.

(3) In the cellulose acylate oxoalkanoate according to one of (1) and (2), $R^1$ may be selected from methyl, ethyl, and propyl.

(4) In the cellulose acylate oxoalkanoate according to any one of (1) to (3), $R^1$ may be methyl.

(5) In the cellulose acylate oxoalkanoate according to any one of (1) to (4), $R^2$ and $R^3$ may be, identically or differently in each occurrence, $C_6$-$C_{10}$ alkyl.

(6) In the cellulose acylate oxoalkanoate according to any one of (1) to (5), $R^2$ and $R^3$ may be, identically or differently in each occurrence, $C_{16}$-$C_{20}$ alkyl.

(7) In the cellulose acylate oxoalkanoate according to any one of (1) to (6), x and y may meet conditions specified by Expressions (A') and (B'):

$$2.3 \leq x \leq 2.95 \quad (A')$$

$$0.05 \leq y \leq 0.70 \quad (B')$$

(8) In the cellulose acylate oxoalkanoate according to any one of (1) to (7), x and y may meet a condition specified by Expression (D):

$$0.15 \leq x+y \leq 3 \quad (D)$$

(9) In the cellulose acylate oxoalkanoate according to any one of (1) to (8), x and y may meet a condition specified by Expression (D'):

$$2.35 \leq x+y \leq 3 \quad (D')$$

(10) The present invention also provides a method for producing a cellulose acylate oxoalkanoate to produce the cellulose acylate oxoalkanoate according to any one of (1) to 9. The method includes the step of reacting a cellulose acylate with a cyclic lactone represented by General Formula (3). The cellulose acylate corresponds to cellulose, except with the group represented by General Formula (1) replacing part of hydrogen atoms in hydroxy groups of the cellulose. In the cellulose acylate, x and z meet conditions specified by Expressions (A) and (E):

$$0.1 \leq x \leq 2.99 \quad (A)$$

$$z = 3-x \quad (E),$$

[Chem. 4]

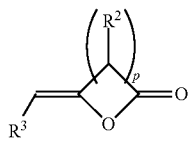

(3)

where $R^2$, $R^3$, and p are as in General Formula (2).

(11) In the method according to (10) for producing a cellulose acylate oxoalkanoate, the cyclic lactone represented by General Formula (3) may be a compound represented by General Formula (3'):

[Chem. 5]

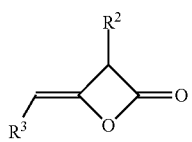

(3')

where $R^2$ and $R^3$ are as in General Formula (2').

Advantageous Effects of Invention

The cellulose acylate oxoalkanoate according to the present invention offers excellent water resistance because the cellulose acylate oxoalkanoate has the configuration as to contain both an acyl group and an oxoalkanoyl group as substituents for hydrogen atoms in hydroxyl groups of the cellulose, as described above. In particular, the cellulose acylate oxoalkanoate, when containing, as the oxoalkanoyl group, an oxoalkanoyl group whose alkyl moiety contains 6 or more carbon atoms, offers extremely excellent water resistance. This is because this cellulose acylate oxoalkanoate is more highly hydrophobized by the oxoalkanoyl group. In addition, the cellulose acylate oxoalkanoate according to the present invention is applicable to wide-ranging uses, because the cellulose acylate oxoalkanoate can be controlled in balance between water resistance and hydrophilicity and balance between water resistance and heat resistance at high levels by controlling the degrees of substitution with the acyl group and with the oxoalkanoyl group, respectively. In particular, the cellulose acylate oxoalkanoate according to the present invention is preferably usable in uses requiring high water resistance, whereas known cellulosic materials are hardly usable in these uses.

BRIEF DESCRIPTION OF DRAWING

FIG. 1 depicts a $^1$H-NMR spectrum chart of a compound 1 synthesized in Example 1.

DESCRIPTION OF EMBODIMENTS

The cellulose acylate oxoalkanoate according to the present invention is a derivative of cellulose $((C_6H_{10}O_5)_n$; where n represents a degree of polymerization), except with substituents replacing part or all of hydrogen atoms in hydroxy groups of the cellulose, where the substituents include a group represented by General Formula (1) and a group represented by General Formula (2). General Formulae (1) and (2) are expressed as follows:

[Chem. 6]

(1)

[Chem. 7]

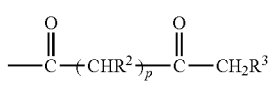

(2)

As used herein, the term "cellulose" refers to a polymeric compound as a polymer of a multiplicity of glucose rings (glucopyranose units, also referred to as glucose units) linked (polymerized) through β-1,4-glycoside bonds, in which none of hydrogen atoms in hydroxy groups bonded to carbon atoms at the 2-position, 3-position, and 6-position of the glucose rings is replaced by (substituted with) a substituent. Also as used herein, the term "hydroxy groups of the cellulose" refers to hydroxy groups bonded to carbon atoms at the 2-position, 3-position, and 6-position in the glucose rings of the cellulose.

More specifically, the cellulose acylate oxoalkanoate according to the present invention is a cellulose derivative including a constitutional repeating unit represented by General Formula (X):

[Chem. 8]

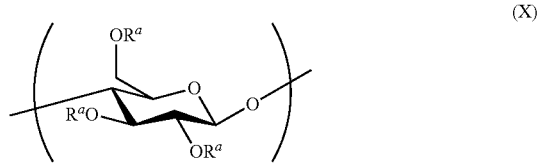

(X)

In General Formula (X), $R^a$ is, identically or differently in each occurrence, selected from hydrogen and a substituent. In the cellulose acylate oxoalkanoate according to the present invention, part or all of the occurrences of $R^a$ in the constitutional repeating unit represented by General Formula (X) are substituents, and the substituents are the group represented by General Formula (1) and the group represented by General Formula (2). The cellulose acylate oxoalkanoate according to the present invention offers excellent water resistance because of containing both the group represented by General Formula (1) and the group represented by General Formula (2) as the substituents, as described above.

The cellulose acylate oxoalkanoate according to the present invention has only to contain the group represented by General Formula (1) and the group represented by General Formula (2) as the substituents at any moieties or positions in the molecule. The cellulose acylate oxoalkanoate according to the present invention may include a single constitutional repeating unit represented by General Formula (X) or may include two or more different constitutional repeating units represented by General Formula (X). The cellulose acylate oxoalkanoate according to the present invention does not necessarily have to contain both the group represented by General Formula (1) and the group represented by General Formula (2) in one constitutional repeating unit. For example, the cellulose acylate oxoalkanoate according to the present invention may be a polymer that includes a constitutional repeating unit represented by General Formula (X) where part or all of the occurrences of $R^a$ are the group represented by General Formula (1), and a constitutional repeating unit represented by General Formula (X) where part or all of the occurrences of $R^a$ are the group represented by General Formula (2); or may be a polymer that includes a constitutional unit represented by General Formula (X) where part or all of the occurrences of $R^a$ are both the group represented by General Formula (1) and the group represented by General Formula (2); or may be a polymer in which two or more different constitutional repeating units represented by General Formula (X) are randomly polymerized.

In General Formula (1), $R^1$ is selected from $C_1$-$C_{10}$ alkyl (alkyl containing from 1 to 10 carbon atoms), a straight or branched chain unsaturated hydrocarbon group, and an optionally substituted aromatic group. Non-limiting examples of the $C_1$-$C_{10}$ alkyl include methyl, ethyl, propyl, isopropyl, butyl, isobutyl, s-butyl, t-butyl, pentyl, isopentyl, hexyl, heptyl, octyl, 2-ethylhexyl, nonyl, and decyl. Non-limiting examples of the straight or branched chain unsaturated hydrocarbon group include vinyl, allyl, 1-propenyl, 2-butenyl, 1-pentenyl, 2-hexenyl, 1,3-pentadienyl, 1,3-hexadienyl, and pentynyl. Non-limiting examples of the aromatic group include $C_6$-$C_{14}$ aromatic groups such as phenyl, naphthyl, phenanthryl, and anthracenyl. Non-limiting examples of substituents which the aromatic group may have include halogen such as fluorine, chlorine, bromine, and iodine; hydroxy; cyano; mercapto; carboxy; sulfo; nitro; and amino. The number of such substituents in the substituted aromatic group is not limited and is typically 1 to 4. Two or more substituents, when substituted on the aromatic group, may be identical or different. The position(s) of the substituent(s) in the substituted aromatic group is not limited.

In particular, the group represented by General Formula (1) is preferably a group where $R^1$ is $C_1$-$C_{10}$ alkyl, more preferably a group where $R^1$ is selected from methyl, ethyl, and propyl, and furthermore preferably a group where $R^1$ is methyl. These groups are preferred for offering excellent balance between water resistance and heat resistance.

The cellulose acylate oxoalkanoate according to the present invention may contain each of different groups represented by General Formula (1) alone or in combination.

The degree x of substitution with the group represented by General Formula (1) (hereinafter also simply referred to as "x") in the cellulose acylate oxoalkanoate according to the present invention meets the condition specified by Expression (A). In particular, x is preferably meets the condition specified by Expression (A'). The cellulose acylate oxoalkanoate, as having a degree x meeting the condition specified by Expression (A) (in particular, the condition specified by Expression (A')), tends to have heat resistance and water resistance both at very high levels in good balance. Expressions (A) and (A') are expressed as follows:

$$0.1 \leq x \leq 2.99 \quad (A)$$

$$2.3 \leq x \leq 2.95 \quad (A')$$

The degree x of substitution with the group represented by General Formula (1) refers to the number (average) of the group represented by General Formula (1) per one constitutional repeating unit represented by General Formula (X) in the cellulose acylate oxoalkanoate according to the present invention. The degree x can be measured by a well-known, common method and can be analyzed and measured typically by $^1$H-NMR or $^{13}$C-NMR.

In General Formula (2), $R^2$ and $R^3$ are, identically or differently in each occurrence, selected from hydrogen, $C_1$ or higher alkyl, a straight or branched chain unsaturated hydrocarbon group, and an optionally substituted aromatic group. Non-limiting examples of the $C_1$ or higher alkyl (alkyl containing 1 or more carbon atoms) include $C_1$-$C_{30}$ alkyl such as methyl, ethyl, propyl, isopropyl, butyl, isobutyl, s-butyl, t-butyl, pentyl, isopentyl, hexyl, heptyl, octyl, 2-ethylhexyl, nonyl, decyl, undecyl, dodecyl, tridecyl, tetradecyl, pentadecyl, hexadecyl, heptadecyl, octadecyl, nonadecyl, icosyl, henicosyl, docosyl, and triacontyl. Non-limiting examples of the straight or branched chain unsaturated hydrocarbon group include vinyl, allyl, 1-propenyl, 2-butenyl, 1-pentenyl, 2-hexenyl, 1,3-pentadienyl, 1,3-hexadienyl, and pentynyl. Non-limiting examples of the aromatic group include $C_6$-$C_{14}$ aromatic groups such as phenyl, naphthyl, phenanthryl, and anthracenyl. Non-limiting examples of substituents which the aromatic group may have include halogen such as fluorine, chlorine, bromine, and iodine; hydroxy; cyano; mercapto; carboxy; sulfo; nitro; and amino. The number of substituents in the substituted aromatic group is not limited and is typically 1 to 4. Two or more substituents, when substituted on the aromatic group, may be identical or different. The position(s) of the substituent(s) in the substituted aromatic group is not limited.

In General Formula (2), p represents an integer of 1 to 10. In particular, p is preferably an integer of 1 to 5, more preferably 1 or 2, and furthermore preferably 1. This is preferred from the viewpoints of raw material availability and productivity. Specifically, of the groups represented by General Formula (2), preferred are groups in which p is 1, namely, groups represented by General Formula (2') below. In General Formula (2'), $R^2$ and $R^3$ are, identically or differently in each occurrence, as in General Formula (2). In other words, the cellulose acylate oxoalkanoate according to the present invention is preferably, in particular, a cellulose acylate 3-oxoalkanoate containing an 3-oxoalkanoyl group represented by General Formula (2'). When p is 1, at least one of $R^2$ and $R^3$ is not hydrogen. Namely, the group represented by —CO—$CH_2$—CO—$CH_2$ is excluded from the groups represented by General Formula (2'). General Formula (2') is expressed as follows:

[Chem. 9]

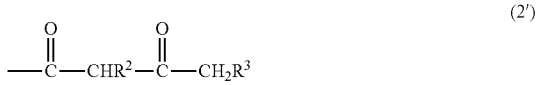

(2')

Non-limiting examples of the groups represented by General Formula (2) where p is 2 to 10 include 4-oxopentanoyl, 5-oxohexanoyl, 6-oxoheptanoyl, 7-oxooctanoyl, 8-oxononanoyl, 9-oxodecanoyl, 10-oxoundecanoyl, 11-oxodecanoyl, and 12-oxotridecanoyl.

Of the groups represented by General Formula (2) (e.g., the groups represented by General Formula (2')), preferred are groups where $R^2$ and $R^3$ are, identically or differently in each occurrence, $C_6$-$C_{30}$ alkyl, and more preferred are groups where $R^2$ and $R^3$ are, identically or differently in each occurrence, $C_{10}$-$C_{20}$ alkyl. These groups contribute to excellent balance between water resistance and heat resistance.

The cellulose acylate oxoalkanoate according to the present invention may contain each of different groups represented by General Formula (2) alone or in combination.

The degree y of substitution with the group represented by General Formula (2) (hereinafter also simply referred to as "y") in the cellulose acylate oxoalkanoate according to the present invention meets the condition specified by Expression (B). In particular, y is preferably meets the condition specified by Expression (B'). The cellulose acylate oxoalkanoate, as having a degree y meeting the condition specified by Expression (B) (in particular, the condition specified by Expression (B')), tends to have heat resistance and water resistance both at very high levels in good balance. Expressions (B) and (B') are expressed as follows:

$$0.01 \le y \le 2.90 \tag{B}$$

$$0.05 \le y \le 0.70 \tag{B'}$$

The degree y of substitution with the group represented by General Formula (2) refers to the number (average) of the group represented by General Formula (2) per one constitutional repeating unit represented by General Formula (X) in the cellulose acylate oxoalkanoate according to the present invention. The degree y can be measured by a well-known, common method and can be analyzed and measured typically by $^1$H-NMR or $^{13}$C-NMR.

As described above, the cellulose acylate oxoalkanoate according to the present invention meets the conditions specified by Expression (A) and Expression (B) and preferably meets the conditions specified by Expression (A') and Expression (B'). This is preferred from the viewpoint of balance between water resistance and heat resistance. Specifically, the total (x+y) of x and y in the cellulose acylate oxoalkanoate according to the present invention meets a condition specified by Expression (D). In particular, the total of x and y (x+y) preferably meets a condition specified by Expression (D'). Expressions (D) and (D') are expressed as follows:

$$0.15 \le x+y \le 3 \tag{D}$$

$$2.35 \le x+y \le 3 \tag{D'}$$

The cellulose acylate oxoalkanoate according to the present invention may have an unsubstituted hydroxy group(s), where "unsubstituted hydroxy group" refers to a group on which no substituent is substituted. The number of such unsubstituted hydroxy group(s) of the cellulose acylate oxoalkanoate according to the present invention is not limited. The degree z of unsubstitution may be controlled to be, for example, 0 to 2.85. The degree z of unsubstitution (hereinafter also simply referred to as "degree of unsubstitution" or "z") refers to the number (average) of unsubstituted hydroxy groups ($OR^a$ groups of General Formula (X) where $R^a$ is H) per one constitutional repeating unit represented by General Formula (X). The degree z can be measured by a well-known, common method and can be analyzed and measured typically by $^1$H-NMR or $^{13}$C-NMR. The degree z of unsubstitution can also be determined by subtracting the total of degrees of substitution with the substituents from 3. The total of degrees of substitution is "x+y", which is the total of the degree x of substitution with the group represented by General Formula (1) and the degree y of substitution with the group represented by General Formula (2).

In the cellulose acylate oxoalkanoate according to the present invention, the total (total sum) of the degree x of substitution with the group represented by General Formula (1), the degree y of substitution with the group represented by General Formula (2), and the degree z of unsubstitution is approximately 3. Specifically, the cellulose acylate oxoalkanoate according to the present invention approximately meets the condition specified by Expression (C):

$$z=3-x-y \tag{C}$$

The cellulose acylate oxoalkanoate according to the present invention may have an average degree of polymerization not limited, but preferably 2 to 10000, more preferably 15 to 5000, and furthermore preferably 50 to 5000.

The cellulose acylate oxoalkanoate according to the present invention contains the group represented by General Formula (1) and the group represented by General Formula (2) as substituents replacing part or all of hydrogen atoms in the hydroxy groups of the cellulose and has x and y controlled within the specific ranges, as described above. This allows the cellulose acylate oxoalkanoate to offer excellent water resistance. The cellulose acylate oxoalkanoate according to the present invention is usable in various uses such as those in the fields of wrapping paper, printing, fibers, and medical care. In particular, the cellulose acylate oxoalkanoate is advantageously usable typically in or for various paper, sizing agents, sheets, films, fibers, nonwoven fabrics, and components or members in various products, and any other components (constituent materials), each of which requires high water resistance. The cellulose acylate oxoalkanoate according to the present invention not only offers excellent water resistance, but also can be used as a thermoplastic resin and subjected to melt molding, because the cellulose acylate oxoalkanoate is suitably plasticized by the oxoalkanoyl group(s).

The cellulose acylate oxoalkanoate according to the present invention may be produced by any production method not limited. The cellulose acylate oxoalkanoate according to the present invention can be produced by utilizing a technique selected from known or common cellulose derivative production techniques and techniques commonly employed in the field of organic synthesis. Specifically, the cellulose acylate oxoalkanoate according to the present invention can be produced typically by a method including the step of reacting a material cellulose ester with a cyclic lactone represented by General Formula (3) as an essential step. The "material cellulose ester" refers to a cellulose acylate corresponding to cellulose, except with the group represented by General Formula (1) replacing part of hydrogen atoms in the hydroxy groups of the cellulose. This step is the step of reacting the hydroxy group(s) of the material cellulose ester with the cyclic lactone represented by General Formula (3) to replace the hydrogen atom(s) of the hydroxy group(s) with the group represented by General Formula (2). General Formula (3) is expressed as follows:

[Chem. 10]

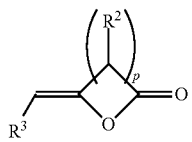

(3)

The material cellulose ester may be selected from cellulose esters corresponding to the cellulose acylate oxoalkanoate according to the present invention, except with hydrogen atom(s) replacing the group(s) represented by General Formula (2) of the cellulose acylate oxoalkanoate. Specifically, the material cellulose ester can be selected from those in which the degree x of substitution with the group represented by General Formula (1) meets the condition specified by Expression (A) (in particular, the condition specified by Expression (A')), the degree y of substitution with the substituent represented by General Formula (2) is 0 (zero), and x and z (degree of unsubstitution) meets the condition specified by Expression (E). Expressions (A), (A'), and (E) are expressed as follows:

$$0.1 \leq x \leq 2.99 \tag{A}$$

$$2.3 \leq x \leq 2.95 \tag{A'}$$

$$z = 3 - x \tag{E}$$

The material cellulose ester can be produced from cellulose by a known or common method, or may be selected from commercial products. Such commercial products are exemplified by, but not limited to, commercial products of cellulose acetate, cellulose propionate, cellulose acetate propionate, cellulose butyrate, and cellulose acetate butyrate. In addition, a reaction mixture prepared from cellulose by a known or common method can also be used as the material cellulose ester as intact without isolation.

In General Formula (3), $R^2$ and $R^3$ correspond respectively to $R^2$ and $R^3$ in the group represented by General Formula (2) of the cellulose acylate oxoalkanoate according to the present invention to be produced and are, identically or differently in each occurrence, selected from hydrogen, $C_1$ or higher alkyl, a straight or branched chain unsaturated hydrocarbon group, and an optionally substituted aromatic group, as in General Formula (2). Examples and preferred groups as $R^2$ and $R^3$ are as described in General Formula (2).

In General Formula (3), p corresponds to p in the group represented by General Formula (2) of the cellulose acylate oxoalkanoate according to the present invention to be produced and represents an integer of 1 to 10 as in General Formula (2). The preferred range of p is as described in General Formula (2). In particular, p is preferably 1. Specifically, the cyclic lactone represented by General Formula (3) is preferably selected from cyclic lactones represented by General Formula (3'):

[Chem. 11]

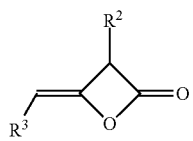

(3')

where $R^2$ and $R^3$ are as in General Formula (2').

Of the cyclic lactones represented by General Formula (3) (e.g., the cyclic lactones represented by General Formula (3')), preferred are those in which $R^2$ and $R^3$ are, identically or differently in each occurrence, $C_6$-$C_{30}$ alkyl (in particular, $C_{10}$-$C_{20}$ alkyl). These are preferred for offering excellent balance between water resistance and heat resistance.

Specific reaction conditions of the reaction between the material cellulose ester and the cyclic lactone represented by General Formula (3) and any other conditions are not limited and can be selected and set as appropriate from among well-known, common conditions. For example, the reaction can be performed with reference to methods described typically in Cellulose (2006), 13, 637-645; and Polymer 46: 2548-2557.

The method for producing the cellulose acylate oxoalkanoate according to the present invention may further include any other step or steps, in addition to the step.

The cellulose acylate oxoalkanoate according to the present invention may also be produced by any of other methods. A non-limiting example of the other methods is a method that includes the step of reacting the material cellulose ester with an oxocarboxylic acid represented by General Formula (4) or a derivative of the oxocarboxylic acid as an essential step. The derivative is exemplified by esters, acid anhydrides and acid halides. This step is the step of reacting the hydroxy group(s) of the material cellulose ester with the oxocarboxylic acid represented by General Formula (4) or a derivative of the oxocarboxylic acid to replace hydrogen atom(s) of the hydroxy group(s) with the group represented by General Formula (2). Specific conditions of the reaction and any other conditions are not limited and can be selected and set as appropriate from among well-known, common conditions. Formula (4) is expressed as follows:

[Chem. 12]

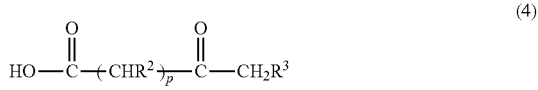

(4)

where $R^2$, $R^3$, and p are, identically or differently in each occurrence, as in General Formula (2).

EXAMPLES

The present invention will be illustrated in further detail with reference to several examples below. It should be noted, however, that the examples are by no means intended to limit the scope of the present invention.

Example 1

Synthesis of Compound 1 (Cellulose acetate (2-hexadecyl-3-oxoicosanoate))

The compound 1 is a cellulose derivative containing a group represented by General Formula (1), where $R^1$ is $CH_3$, and a group represented by General Formula (2'), where $R^2$ and $R^3$ are $C_{16}H_{33}$ and having x of 2.4 and y of 0.6.

In a 0.5-L three-necked flask mounted with a mechanical stirrer, a thermometer, a condenser, and a dropping funnel, 10.5 g of a cellulose acetate having a degree of substitution of 2.4 and 200 g of N,N-dimethylimidazolidinone were placed, followed by stirring at 60° C. for one hour to dissolve the cellulose acetate. Next, 5.6 g of N-methylimidazole were added at 60° C., subsequently 38.6 g of 4-heptadecylidene-3-hexadecyloxetan-2-one (a compound represented by General Formula (3') where $R^2$ and $R^3$ are $C_{16}H_{33}$) were added, followed by further stirring at 60° C. for 3 hours to react the components. After the reaction, the reaction mixture (reaction solution) was naturally cooled down to room temperature and poured into 1200 g of 2-propanol with vigorous stirring to precipitate a white solid. The white solid was separated by suction filtration and washed with 2-propanol three times. The resulting white solid was dried at 80° C. for 12 hours and yielded 11.7 g of the target compound 1. The compound 1 was subjected to $^1$H-NMR measurement and was found to have a degree (x) of acetyl substitution of 2.4 and a degree (y) of substitution with 2-hexadecyl-3-oxoicosanoyl group of 0.6, each per glucose unit.

The $^1$H-NMR spectrum (500 MHz, $CDCl_3$) of the compound 1 is illustrated in FIG. 1.

In the IR spectrum of the compound 1, absorption peaks were observed at wavenumbers as follows.

IR: 2918 $cm^{-1}$, 2848 $cm^{-1}$, 1749 $cm^{-1}$, 1707 $cm^{-1}$, 1464 $cm^{-1}$, 1363 $cm^{-1}$, 1228 $cm^{-1}$, 1043 $cm^{-1}$

Example 2

Synthesis of Compound 2 (Cellulose Acetate (2-hexadecyl-3-oxoicosanoate))

The compound 2 is a cellulose derivative containing a group represented by General Formula (1), where $R^1$ is $CH_3$, and a group represented by General Formula (2'), where $R^2$ and $R^3$ are $C_{16}H_{33}$, and having x of 2.9 and y of 0.1.

The target compound 2 was obtained in an amount of 11.2 g by performing an operation similar to that in Example 1, except using 11.4 g of a cellulose acetate having a degree of substitution of 2.9 instead of the cellulose acetate having a degree of substitution of 2.4, and using the 4-heptadecylidene-3-hexadecyloxetan-2-one (compound represented by General Formula (3') where $R^2$ and $R^3$ are $C_{16}H_{33}$) in an amount of 7.0 g.

The degrees x and y of substitution of the compound 2 were determined by $^1$H-NMR measurement. Results are presented in Table 1. In this connection, the degrees x and y of substitution of products obtained in the following examples were determined in a similar manner.

Example 3

Synthesis of Compound 3 (Cellulose acetate (2-hexadecyl-3-oxoicosanoate))

The compound 3 is a cellulose derivative containing a group represented by General Formula (1), where $R^1$ is $CH_3$, and a group represented by General Formula (2'), where $R^2$ and $R^3$ are $C_{16}H_{33}$, and having x of 2.4 and y of 0.3.

The target compound 3 was obtained in an amount of 9.3 g by performing an operation similar to that in Example 1, except using the 4-heptadecylidene-3-hezadecyloxetan-2-one (compound represented by General Formula (3') where $R^2$ and $R^3$ are $C_{16}H_{33}$) in an amount of 13.0 g.

Examples 4 to 18

Syntheses of Compounds 4 to 18

By a procedure similar to that in Example 1, a cellulose ester (material cellulose ester; $R^1$ and x are as in Table 1) and a cyclic lactone (compound represented by General Formula (3'); $R^2$ and $R^3$ are as in Table 1) given in Table 1 were reacted with each other and yielded a series of compounds 4 to 18 (cellulose derivatives) as in Table 1. The compounds 4 to 18 had x, y, and z as in Table 1.

Example 19

Synthesis of Compound 19 (Cellulose acetate propionate (2-hexadecyl-3-oxoicosanoate))

In a 0.5-L three-necked flask mounted with a mechanical stirrer, a thermometer, a condenser, and a dropping funnel, 11.3 g of a cellulose acetate propionate (supplied by Aldrich Co., LLC., having an acetyl percentage of 0.6% and a propionyl percentage of 42.5%) and 200 g of N,N-dimethylimidazolidinone, followed by stirring at 60° C. for one hour to dissolve the cellulose acetate propionate. Next, 5.6 g of N-methylimidazole were added at 60° C., and, subsequently, 28.0 g of 4-heptadecylidene-3-hexadecyloxetan-2-one (compound represented by General Formula (3') where $R^2$ and $R^3$ are $C_{16}H_{33}$) were added, followed by further stirring at 60° C. for 3 hours. After the reaction, the reaction mixture was naturally cooled down to room temperature and poured into 1200 g of 2-propanol with rigorous stirring to precipitate a white solid. The white solid was separated by suction filtration and washed with 2-propanol three times. The resulting white solid was dried at 80° C. for 12 hours and yielded 24.6 g of the target compound 19.

TABLE 1

| | Material | | | | | | |
|---|---|---|---|---|---|---|---|
| | Material cellulose ester | | | Cyclic lactone represented by General Formula (3') | | | Mole ratio Ratio of cyclic lactone represented by General Formula (3') to OH group of material cellulose ester |
| | $R^1$ | x | Weight (g) | $R^2$ | $R^3$ | Weight (g) | |
| Example 1 | $CH_3$ | 2.4 | 10.5 | $C_{16}H_{33}$ | $C_{16}H_{33}$ | 38.6 | 3 |
| Example 2 | $CH_3$ | 2.9 | 11.4 | $C_{16}H_{33}$ | $C_{16}H_{33}$ | 7.0 | 3 |
| Example 3 | $CH_3$ | 2.4 | 10.5 | $C_{16}H_{33}$ | $C_{16}H_{33}$ | 13.0 | 1 |
| Example 4 | $CH_3$ | 1.9 | 9.7 | $C_{16}H_{33}$ | $C_{16}H_{33}$ | 35.4 | 1.5 |
| Example 5 | $CH_3$ | 1.9 | 9.7 | $C_{16}H_{33}$ | $C_{16}H_{33}$ | 18.8 | 0.8 |
| Example 6 | $CH_3$ | 1.9 | 9.7 | $C_{16}H_{33}$ | $C_{16}H_{33}$ | 16.0 | 0.6 |
| Example 7 | $CH_3$ | 2.9 | 11.4 | $C_{16}H_{33}$ | $C_{16}H_{33}$ | 6.4 | 3 |
| Example 8 | $CH_3$ | 2.4 | 10.5 | $C_{14}H_{29}$ | $C_{14}H_{29}$ | 17.3 | 1.5 |
| Example 9 | $CH_3$ | 2.4 | 10.5 | $C_{14}H_{29}$ | $C_{14}H_{29}$ | 12.7 | 1.1 |
| Example 10 | $CH_3$ | 2.4 | 10.5 | $C_6H_{13}$ | $C_6H_{13}$ | 9.2 | 1.5 |
| Example 11 | $CH_3$ | 2.4 | 10.5 | $C_6H_{13}$ | $C_6H_{13}$ | 6.1 | 1 |
| Example 12 | $CH_3$ | 2.4 | 10.5 | $C_8H_{17}$ | $C_8H_{17}$ | 11.2 | 1.5 |
| Example 13 | $C_2H_5$ | 2.5 | 12.1 | $C_{16}H_{33}$ | $C_{16}H_{33}$ | 16.1 | 1.5 |
| Example 14 | $C_2H_5$ | 2.5 | 12.1 | $C_{14}H_{29}$ | $C_{14}H_{29}$ | 14.4 | 1.5 |
| Example 15 | $C_2H_5$ | 2.5 | 12.1 | $C_6H_{13}$ | $C_6H_{13}$ | 7.7 | 1.5 |
| Example 16 | $C_3H_7$ | 2.3 | 12.9 | $C_{16}H_{33}$ | $C_{16}H_{33}$ | 22.5 | 1.5 |
| Example 17 | $C_3H_7$ | 2.3 | 12.9 | $C_{14}H_{29}$ | $C_{14}H_{29}$ | 20.2 | 1.5 |
| Example 18 | $C_3H_7$ | 2.3 | 12.9 | $C_6H_{13}$ | $C_6H_{13}$ | 10.8 | 1.5 |
| Example 19 | GAP ($CH_3$, $C_2H_5$) | $CH_3$: 0.04 $C_2H_5$: 2.09 | 11.3 | $C_{16}H_{33}$ | $C_{16}H_{33}$ | 28.0 | 1.5 |

| | Product | | | | | |
|---|---|---|---|---|---|---|
| | | Cellulose acylate 3-oxoalkanoate | | | | Chemical yield (%) |
| | Compound name | x | y | z | Weight (g) | Cellulose basis |
| Example 1 | Compound 1 | 2.4 | 0.5 | 0 | 11.7 | 50 |
| Example 2 | Compound 2 | 2.9 | 0.1 | 0 | 11.2 | 83 |
| Example 3 | Compound 3 | 2.4 | 0.3 | 0.3 | 9.3 | 55 |
| Example 4 | Compound 4 | 1.9 | 1.1 | 0 | 26.3 | 79 |
| Example 5 | Compound 5 | 1.9 | 0.9 | 0.2 | 23.2 | 80 |
| Example 6 | Compound 6 | 1.9 | 0.3 | 0.8 | 11 | 68 |
| Example 7 | Compound 7 | 2.9 | 0.05 | 0.05 | 10.2 | 82 |
| Example 8 | Compound 8 | 2.4 | 0.6 | 0 | 17.6 | 80 |
| Example 9 | Compound 9 | 2.4 | 0.2 | 0.4 | 10.8 | 75 |
| Example 10 | Compound 10 | 2.4 | 0.6 | 0 | 11.3 | 68 |
| Example 11 | Compound 11 | 2.4 | 0.4 | 0.2 | 10.5 | 72 |
| Example 12 | Compound 12 | 2.4 | 0.6 | 0 | 14.0 | 78 |
| Example 13 | Compound 13 | 2.5 | 0.5 | 0 | 16.2 | 71 |
| Example 14 | Compound 14 | 2.5 | 0.5 | 0 | 15.2 | 70 |
| Example 15 | Compound 15 | 2.5 | 0.5 | 0 | 14.1 | 62 |
| Example 16 | Compound 16 | 2.3 | 0.7 | 0 | 21.2 | 76 |
| Example 17 | Compound 17 | 2.3 | 0.7 | 0 | 20.8 | 79 |
| Example 18 | Compound 18 | 2.3 | 0.7 | 0 | 17.9 | 89 |
| Example 19 | Compound 19 | $CH_3$: 0.04 $C_2H_5$: 2.09 | 0.87 | 0 | 24.6 | 82 |

INDUSTRIAL APPLICABILITY

The cellulose acylate oxoalkanoate according to the present invention is advantageously usable, in particular, in uses requiring excellent water resistance, typically as or for components (constitutional materials) for various paper, sizing agents, sheets, films, fibers, nonwoven fabrics, and members or components in various products. In addition, the cellulose acylate oxoalkanoate according to the present invention can be used as a thermoplastic resin and subjected to melt molding, because the cellulose acylate oxoalkanoate is plasticized appropriately by oxoalkanoyl groups.

The invention claimed is:

1. A cellulose acylate oxoalkanoate being a derivative of cellulose, except with substituents replacing part or all of hydrogen atoms in hydroxy groups of the cellulose,
    the substituents comprising:
        a group represented by General Formula (1); and
        a group represented by General Formula (2),
    the cellulose acylate oxoalkanoate having a degree x of substitution with the group represented by General Formula (1), a degree y of substitution with the group represented by General Formula (2), and a degree z of unsubstitution,
    x, y, and z meeting conditions specified by Expressions (A'), (B'), and (C):

$2.3 \leq x \leq 2.95$ (A')

$0.05 \leq y \leq 0.70$ (B')

$0 \leq z \leq 0.05$ (C),

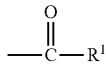 (1)

wherein $R^1$ is selected from $C_1$-$C_{10}$ alkyl, a straight or branched chain unsaturated hydrocarbon group, and an optionally substituted aromatic group,

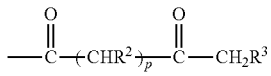 (2)

wherein $R^2$ and $R^3$ are each, identically or differently in each occurrence, selected from hydrogen, $C_1$ or higher alkyl, a straight or branched chain unsaturated hydrocarbon group, and an optionally substituted aromatic group; and p represents an integer of 1 to 10, where at least one of $R^2$ and $R^3$ is not hydrogen when p is 1.

2. The cellulose acylate oxoalkanoate according to claim 1, wherein the group represented by General Formula (2) is a group represented by General Formula (2'):

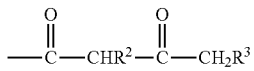 (2')

wherein $R^2$ and $R^3$ are as in General Formula (2), and where at least one of $R^2$ and $R^3$ is not hydrogen.

3. The cellulose acylate oxoalkanoate according to claim 1, wherein $R^1$ is selected from the group consisting of methyl, ethyl, and propyl.

4. The cellulose acylate oxoalkanoate according to claim 1, wherein $R^1$ is methyl.

5. The cellulose acylate oxoalkanoate according to claim 1, wherein $R^2$ and $R^3$ are, identically or differently in each occurrence, $C_6$-$C_{30}$ alkyl.

6. The cellulose acylate oxoalkanoate according to claim 1, wherein $R^2$ and $R^3$ are, identically or differently in each occurrence, $C_6$-$C_{20}$ alkyl.

7. A method for producing the cellulose acylate oxoalkanoate according to claim 1, the method comprising the step of
reacting a cellulose acylate with a cyclic lactone represented by General Formula (3),
the cellulose acylate corresponding to cellulose, except with the group represented by General Formula (1) replacing part of hydrogen atoms in hydroxy groups of the cellulose,
x and z meeting conditions specified by Expressions (A') and (E):

$2.3 \leq x \leq 2.95$ (A')

$z = 3 - x$ (E),

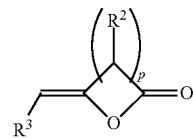 (3)

wherein $R^2$, $R^3$, and p are as in General Formula (2).

8. The method according to claim 7 for producing a cellulose acylate oxoalkanoate,
wherein the cyclic lactone represented by General Formula (3) is a compound represented by General Formula (3'):

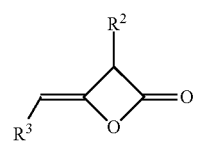 (3')

wherein $R^2$ and $R^3$ are as in General Formula (2).

* * * * *